Aug. 22, 1933.  J. STEIN  1,923,512
ORNAMENTAL SHEET FABRIC AND METHOD OF PRODUCING SAME
Filed May 22, 1930
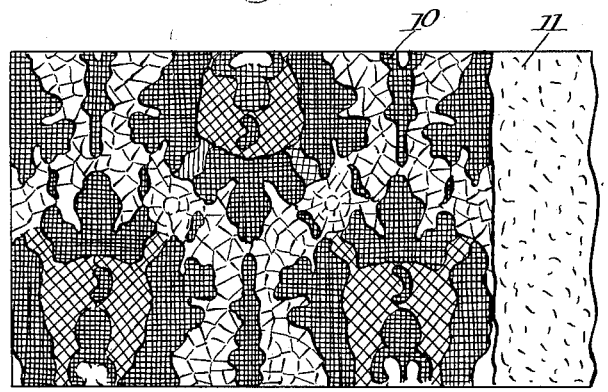
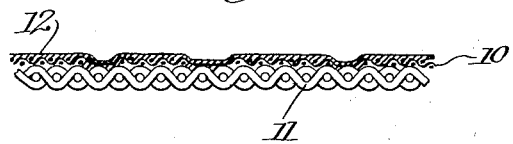
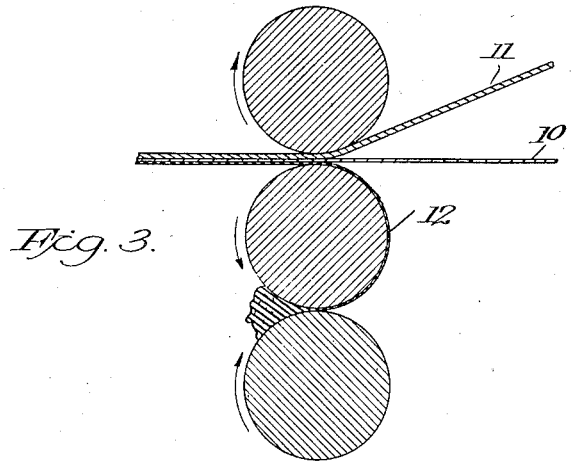
Inventor
Jacob Stein.

Patented Aug. 22, 1933

1,923,512

UNITED STATES PATENT OFFICE 1,923,512

ORNAMENTAL SHEET FABRIC AND METHOD OF PRODUCING SAME

Jacob Stein, Brooklyn, N. Y.

Application May 22, 1930. Serial No. 454,817

5 Claims. (Cl. 154—2)

The present invention relates to the art of ornamenting fabrics, and has for its principal object the application of lace or other open-work materials to a fabric or cloth suitable for garment purposes, the composite fabric being such that the lace or open-work is shielded or protected against snagging and tearing; and, further, that one face of the composite fabric is water absorbing and the other face may be water impervious.

The invention in its broadest and most specific aspects will appear as the specification proceeds and will be pointed out in the appended claims.

A preferred embodiment of the invention selected for purposes of illustration is shown in the accompanying drawing, in which:

Figure 1 is a top plan view of the assembled sheet of material;

Figure 2 is an enlarged sectional view taken through Figure 1; and

Figure 3 is a view showing the manner in which the ornamental sheet of this invention may be made.

A sheet or strip of lace 10 and a sheet or strip of fabric or cloth 11 are fed through a calender face to face. At the same time a thin calendered sheet of rubber 12 is fed through the calender with the sheets 10 and 11, the sheets being so assembled that the sheet of lace or open-work material 10 lies between the sheet of rubber and the sheet of fabric. The result is that the rubber sheet 12 covers the outer surface of the lace and is forced through the open-work or interstices of the lace onto the surface of the fabric material whereby a composite sheet is produced having its laminæ secured together by the rubber sheet 12 which forms the outer lamina thereof.

The rubber sheet 12 is very thin and may be colored, but ordinarily it is preferred to use "white latex" sheet as it forms a substantially clear transparent layer permitting the backing cloth 11 and lace 10 to be clearly visible and enables contrasting color schemes to be used with the fabric and the lace.

Of course, the rubber lamina 12 is suitably vulcanized or cured after the composite sheet is produced. For the purpose of the present illustration, the fabric or cloth material 11 is shown as terry cloth, although any other cloth may be used.

The composite fabric of the present invention possesses the flexibility and softness requisite for use in garments, and is particularly useful as beach coats by virtue of its water-impervious and water-absorbent characteristics, and is also useful for show curtains and certain types of raincoats. However, all of its uses are not enumerated here, but are obvious to those skilled in the art.

The lace forming one of the elements of ornamentation of the present material is held in a flat, smooth condition on the backing material 11, and appears in relief on the surface of the latter. Furthermore, the rubber sheet 12 forms a smooth and tough covering for the lace and thereby shields it from becoming readily snagged or torn. This rubber sheet 12 also gives the composite fabric a certain resiliency which reduces, if not eliminating, wrinkling thereof.

It will be understood that the invention may be variously modified and embodied within the scope of the subjoined claims.

What is claimed is:

1. A method of producing an ornamental composite sheet which includes assembling a backing sheet of cloth, a sheet of lace or open-work fabric and an outer sheet of uncured rubber in superimposed relation, and subjecting the assembly to pressure to force the rubber through the openings in the open-work material and onto said cloth sheet, whereby the laminæ are secured together in a composite sheet and the open-work material is in relief.

2. A method of producing an ornamental composite sheet of material which includes assembling a sheet of cloth, a sheet of heat plastic material and an intermediate sheet of lace or open-work fabric in superimposed relation, and subjecting the assembly to pressure to force the heat plastic material through the openings in the open-work material and onto said cloth sheet whereby the laminæ are secured together in a composite sheet.

3. A composite ornamental sheet comprising a cloth backing having a superficial layer of lace or open-work material on one face thereof, and an outer layer of rubber material covering the outer face of said open-work sheet and extending through the openings in said open-work sheet for securing said open-work sheet to said backing.

4. A composite ornamental sheet material comprising a cloth backing, a layer of lace material on one face of said cloth backing, a thin transparent rubber sheet on the outer face of said lace material and extending through the openings thereof for securing the same to said backing material.

5. A composite ornamental sheet material comprising a terry cloth backing, a layer of lace or open-work material on one face of said cloth backing, a thin transparent rubber sheet on the outer face of said open-work material and extending through the openings thereof and securing the same to said backing material, said rubber sheet also providing a protecting layer covering said open-work sheet preventing snagging of the open-work material.

JACOB STEIN.